United States Patent
Kim et al.

(10) Patent No.: US 8,565,972 B2
(45) Date of Patent: Oct. 22, 2013

(54) DRIVER STATE DETECTION SYSTEM AND METHOD WITH ACCELERATOR PEDAL CONTROL FUNCTION

(75) Inventors: Eunsik Kim, Daegu (KR); Yangrae Cho, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 13/486,887

(22) Filed: Jun. 1, 2012

(65) Prior Publication Data

US 2013/0116888 A1 May 9, 2013

(30) Foreign Application Priority Data

Nov. 8, 2011 (KR) ........................ 10-2011-0115865

(51) Int. Cl.
*G06F 7/00* (2006.01)
(52) U.S. Cl.
USPC ............................................ 701/36; 701/29.1
(58) Field of Classification Search
USPC ........................... 701/29, 29.1, 36, 45; 705/4
See application file for complete search history.

(56) References Cited

U.S. PATENT DOCUMENTS

| 7,218,213 B2 * | 5/2007 | Katagiri et al. ............... 340/466 |
| 2005/0128063 A1 * | 6/2005 | Isaji et al. ..................... 340/439 |
| 2007/0032914 A1 * | 2/2007 | Kondoh et al. .................... 701/1 |
| 2009/0151502 A1 * | 6/2009 | Kim et al. ....................... 74/513 |

FOREIGN PATENT DOCUMENTS

| JP | 2007-68917 A | 3/2007 |
| JP | 2007-137152 A | 6/2007 |
| KR | 10-2008-0051222 A | 6/2008 |
| KR | 10-2008-0051856 A | 6/2008 |
| KR | 10-2010-0064786 A | 6/2010 |
| KR | 10-2011-006217 A | 6/2011 |
| KR | 10-2011-0062751 A | 6/2011 |
| KR | 10-2011-0118215 A | 10/2011 |

* cited by examiner

*Primary Examiner* — Mary Cheung
*Assistant Examiner* — Rodney Butler
(74) *Attorney, Agent, or Firm* — Morgan, Lewis & Bockius LLP

(57) ABSTRACT

A driver-state detection system and method with an accelerator pedal control function detects a driver's state and controlling an accelerator pedal to prevent an accident. The driver-state detection system with an accelerator pedal control function includes a driver-state detector detecting a driving state of a driver and determining whether the driver is carelessly driving a vehicle or not, a pedal controller receiving an operation signal from the driver-state detector, a vehicle state detector determining whether the vehicle is driven or stopped, based on ambient signals of the vehicle, an operation pedal installed to receive operation signals from the pedal controller and the vehicle state detector, and a vibration generator installed on the operation pedal and provided to generate or cancel a vibration of a motor.

6 Claims, 8 Drawing Sheets

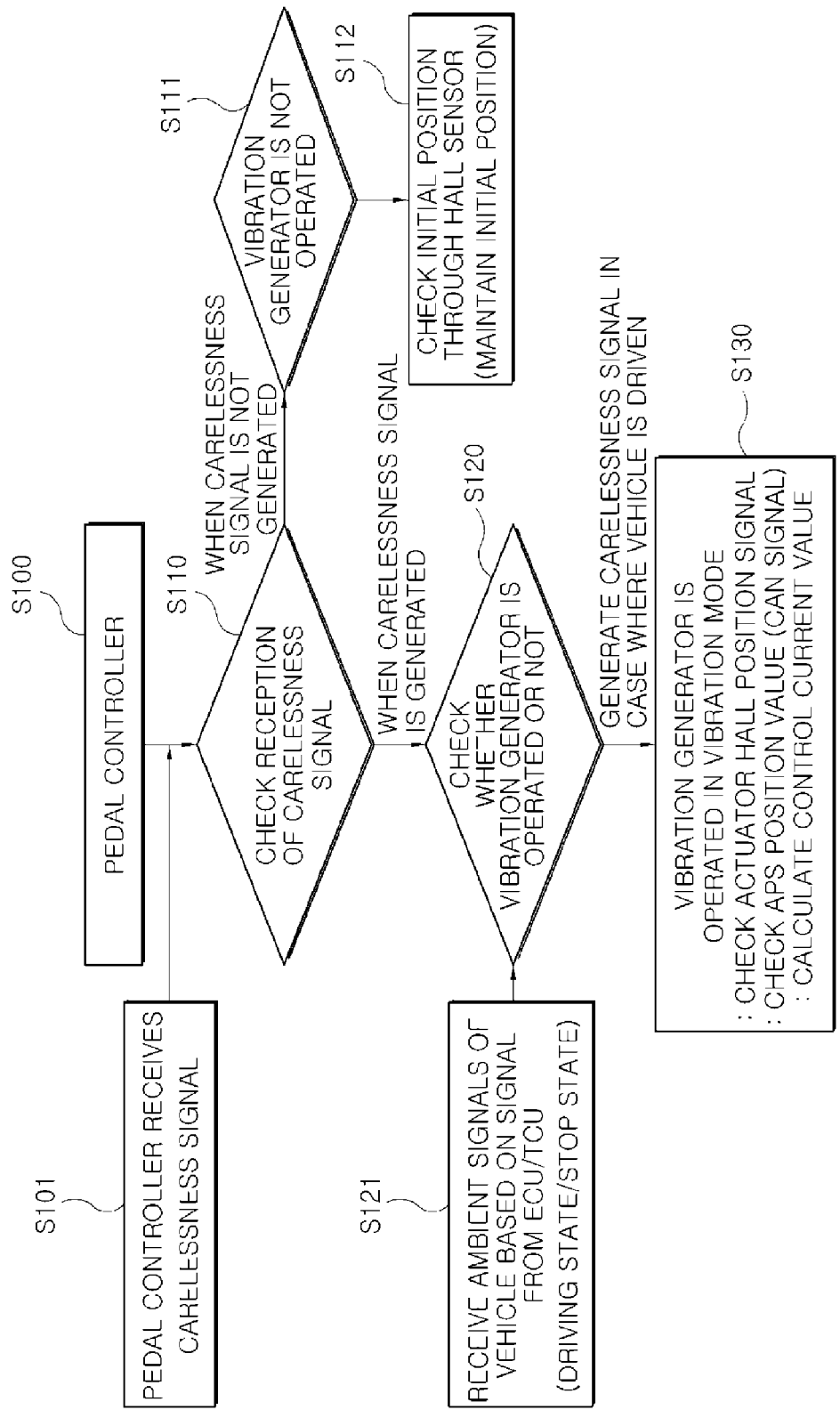

DRIVER STATE DETECTION SYSTEM AND METHOD WITH ACCELERATOR PEDAL CONTROL FUNCTION

CROSS-REFERENCE TO RELATED APPLICATIONS

The present application claims priority to Korean Patent Application Number 10-2011-0115865 filed Nov. 8, 2011, the entire contents of which application is incorporated herein for all purposes by this reference.

BACKGROUND OF INVENTION

1. Field of Invention

The present invention relates to a driver state detection system and method with an accelerator pedal control function, and more particularly, to a driver state detection system and method with an accelerator pedal control function, which is capable of detecting a driver's state and controlling an accelerator pedal to prevent an accident.

2. Description of Related Art

In general, when a vehicle approaches a given extreme driving condition of a road, an active accelerator pedal device of the vehicle controls a pedal force of an accelerator pedal and informs the driver that the vehicle approached the extreme driving condition. When the driver drives the vehicle in a state where the driver set a target speed of the vehicle, an electronic control unit detects an actual vehicle speed and compares the detected speed with the target speed of the driver. When the actual vehicle speed approaches the target speed, the electronic control unit operates an actuator to increase a pedal reaction force or apply a specific feeling, in order to inform the driver that the actual vehicle speed approached the target speed.

Further, the active accelerator pedal device may check a distance from a preceding vehicle and increase a reaction force of the accelerator pedal or apply a specific feeling to limit the speed.

However, in the structure of the active accelerator pedal device according to the related art, the operation of the actuator is transmitted to the accelerator pedal through a plurality of links or cables and other members to control the step force of the accelerator pedal. Accordingly, since the construction of the mechanism becomes complex, the production cost of the active accelerator pedal device may increase, and the durability thereof may decrease.

Therefore, there is demand for a system which detects driving carelessness or effectively informs a driver of driving carelessness, when detecting the driving carelessness.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a driver state detection system and method with an accelerator pedal control function, in which an accelerator pedal applies a strong vibration to call a driver's attention when it is determined that the driver is carelessly driving a vehicle.

Various aspects of the present invention provide for a driver state detection system with an accelerator pedal control function, including a driver state detector detecting a driving state of a driver and determining whether the driver is carelessly driving a vehicle or not, a pedal controller receiving an operation signal from the driver state detector, a vehicle state detector determining whether the vehicle is driven or stopped, based on ambient signals of the vehicle, an operation pedal installed to receive operation signals from the pedal controller and the vehicle state detector, and a vibration generator installed on the operation pedal and provided to generate or cancel a vibration of a motor.

The vibration generator may include a hitting member formed to reciprocate in both directions, a driving unit driving the hitting member in a state where one end of the hitting member is inserted into the driving unit, and a guide unit guiding a reciprocating motion of the hitting member in a state where the other end of the hitting member is inserted into the guide unit.

The driver state detection system may further include a pedal arm disposed so as to be spaced a predetermined distance from the hitting member, and a hitting absorption member formed on one surface of the pedal arm facing the hitting member and repetitively hit by the one end of the hitting member as the hitting member reciprocates.

The driving unit may have a forward coil and a backward coil formed therein to drive the hitting member in both directions.

The hitting member may have an inclined surface formed on the outer circumference thereof such that the diameter of the hitting member gradually decreases toward the hitting absorption member, a locking groove formed on the inclined surface, and a guide protrusion formed so as to be elastically supported by an elastic member in a direction perpendicular to the inclined surface.

The driving unit may have a forward coil formed therein to move the hitting member toward the hitting absorption member.

The operation pedal may be any one of a pendent-type accelerator pedal, an eco-organ accelerator pedal, and a box-type accelerator pedal.

Various aspects of the present invention provide for a driver state detection method with an accelerator pedal control function, including determining whether a driver is carelessly driving a vehicle or not, based on a signal from a driver state detector, transmitting a carelessness signal to an operation pedal, when it is determined that the driver is carelessly driving the vehicle, determining whether the vehicle is driven or stopped, based on ambient signals of the vehicle, and transmitting an operation signal to a vibration generator, when it is determined that the vehicle is driven.

According to the driver state detection system and method with an accelerator pedal control, the intellectual organ accelerator pedal mechanism which is applied to reduce fuel efficiency and improve collision performance is used. Therefore, since a separate signal announcement structure is not applied, the production cost may be reduced.

Further, when it is determined that a driver is carelessly driving a vehicle, the driver may receive a strong vibration signal of the accelerator pedal. Therefore, stability is improved.

In addition, the driver state detection system and method may call the driver's attention when the driver is carelessly driving the vehicle. Therefore, the driver may previously perceive the state, before an accident occurs. Accordingly, since the driver may take off his/her foot from the accelerator pedal and rapidly step on a brake pedal, the merchantability of the vehicle is significantly improved.

Furthermore, the driver state detection system and method may be applied to intellectual accelerator pedals regardless of the types of accelerator pedals.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 7 is a flow chart showing an exemplary driver state detection method with an accelerator pedal control function according to the present invention.

Figure 1:
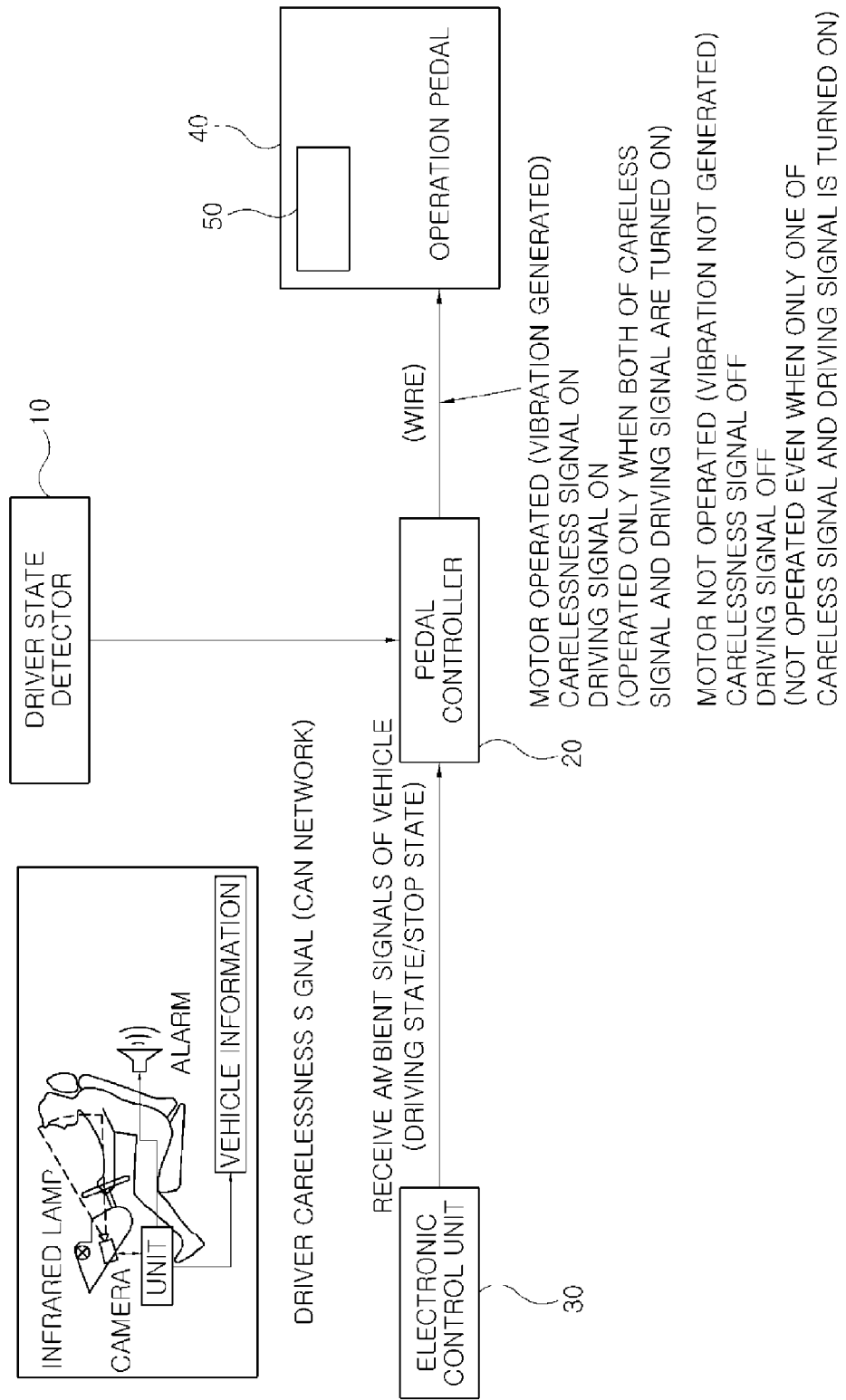
FIG. 1 schematically shows the configuration of an exemplary driver state detection system with an accelerator pedal control function according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 schematically shows the configuration of a driver state detection system with an accelerator pedal control function according to various embodiments of the present invention. As illustrated in FIG. 1, the driver state detection system with an accelerator pedal control function according to various embodiments of the present invention includes a driver state detector 10, a pedal controller 20, a vehicle state controller 30, an operation pedal 40, and a vibration generator 50.

Driver state detector 10 may acquire the face direction of a driver and an eye open/close video using an infrared LED and a camera, and determine whether the driver is carelessly driving a vehicle or not. Here, a driver carelessness signal may be transmitted through controller area network (CAN) communication.

Pedal controller 20 controls operation pedal 40, which will be described below, based on the signal transmitted from vehicle state controller 30. Here, vehicle state controller 30 receives ambient signals of the vehicle. According to the ambient signals, vehicle state controller 30 detects whether the vehicle is driven or stopped, and transmits the detection signal to pedal controller 20.

Operation pedal 40 is controlled by a signal of pedal controller 20, and vibration generator 50 is installed in operation pedal 40.

Figure 2:
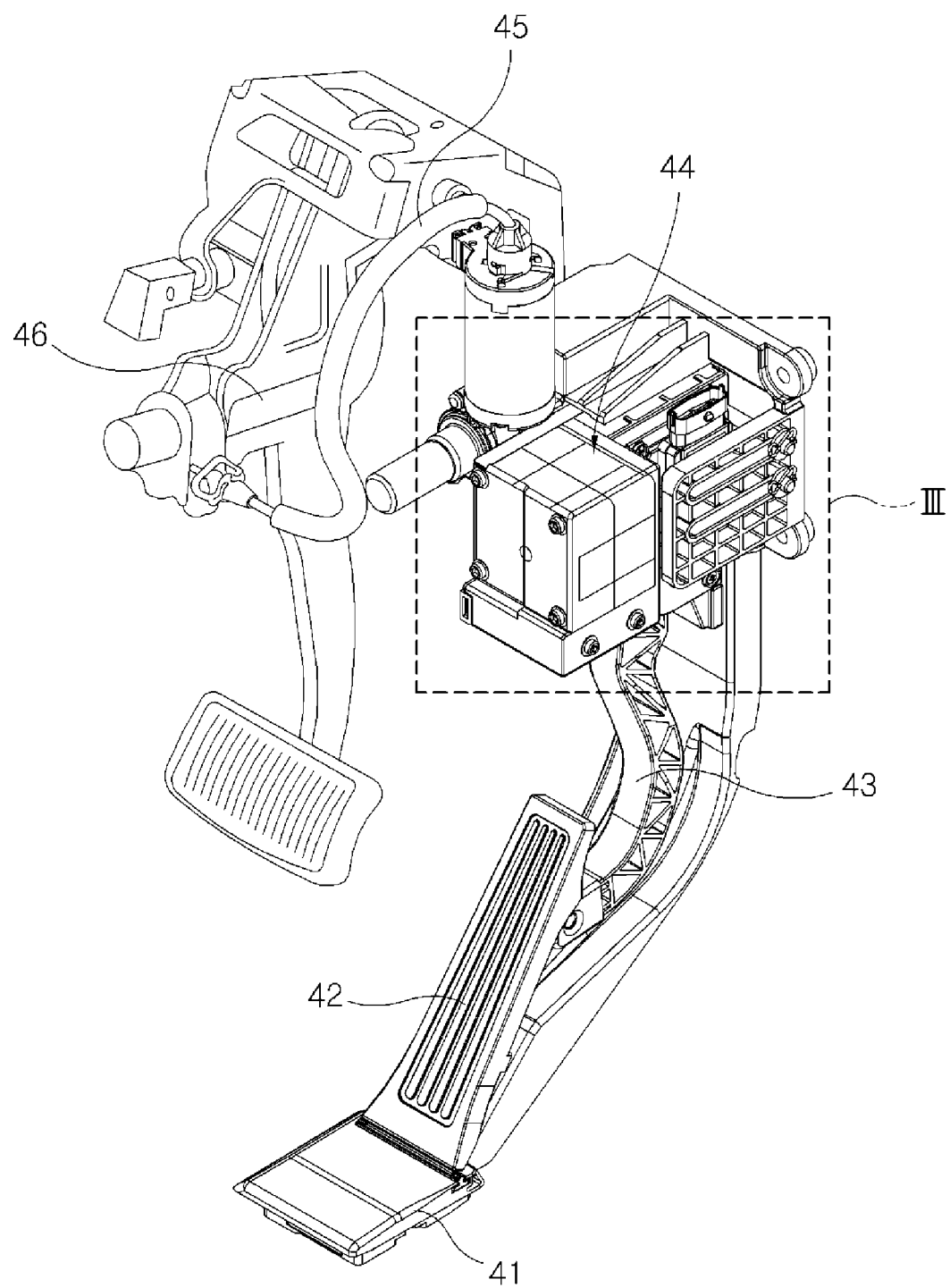
FIG. 2 is a perspective view illustrating a coupling state of an exemplary vibration generator which is applied to the driver state detection system with an accelerator pedal control function according to the present invention.
Figure 3:
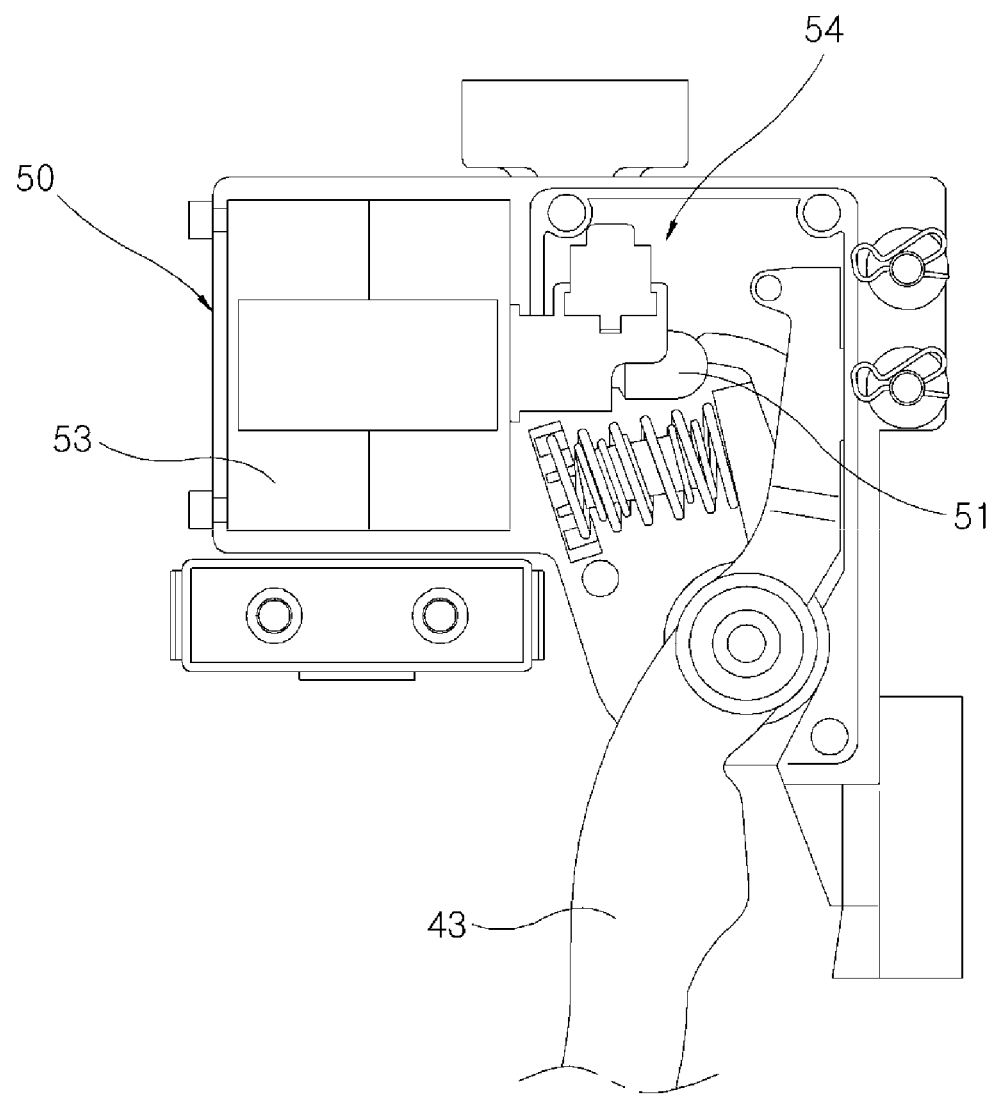
FIG. 3 is a cross-sectional view of the exemplary vibration generator which is applied to the driver state detection system with an accelerator pedal control function according to the present invention.

FIG. 2 is a perspective view illustrating a coupling state of the vibration generator which is applied to the driver state detection system with an accelerator pedal control function according to various embodiments of the present invention. FIG. 3 is a cross-sectional view of the vibration generator which is applied to the driver state detection system with an accelerator pedal control function according to various embodiments of the present invention. Here, as illustrated in FIG. 2, a pedal pad 42 is installed on a lower bracket 41. Pedal pad 42 turns a pedal arm 43 connected thereto and transmits an operation signal to a pedal sensor 44.

That is, pedal pad 42 which may be operated by a driver's stepping three is connected to one end of pedal arm 43 such that pedal arm 43 is turned about a rotating shaft S when the driver steps on pedal pad 42.

Pedal sensor 44 is connected to a brake pedal driving unit 46 through a driving cable 45. FIG. 2 illustrates the structure of a control-type eco-organ accelerator pedal. In addition, although not illustrated, a pendent-type eco-organ accelerator pedal may be applied.

As illustrated in FIG. 3, vibration generator 50 includes a hitting member 51, a driving unit 53, and a guide unit 54.

Hitting member 51 is disposed in such a manner as to reciprocate in both directions. One end of hitting member 51 is inserted into driving unit 53 to drive hitting member 51, and the other end of hitting member 51 is inserted into guide unit 54 to guide a reciprocating motion of hitting member 51. The operation principle of driving unit 53 will be described below in more detail.

Figure 4:
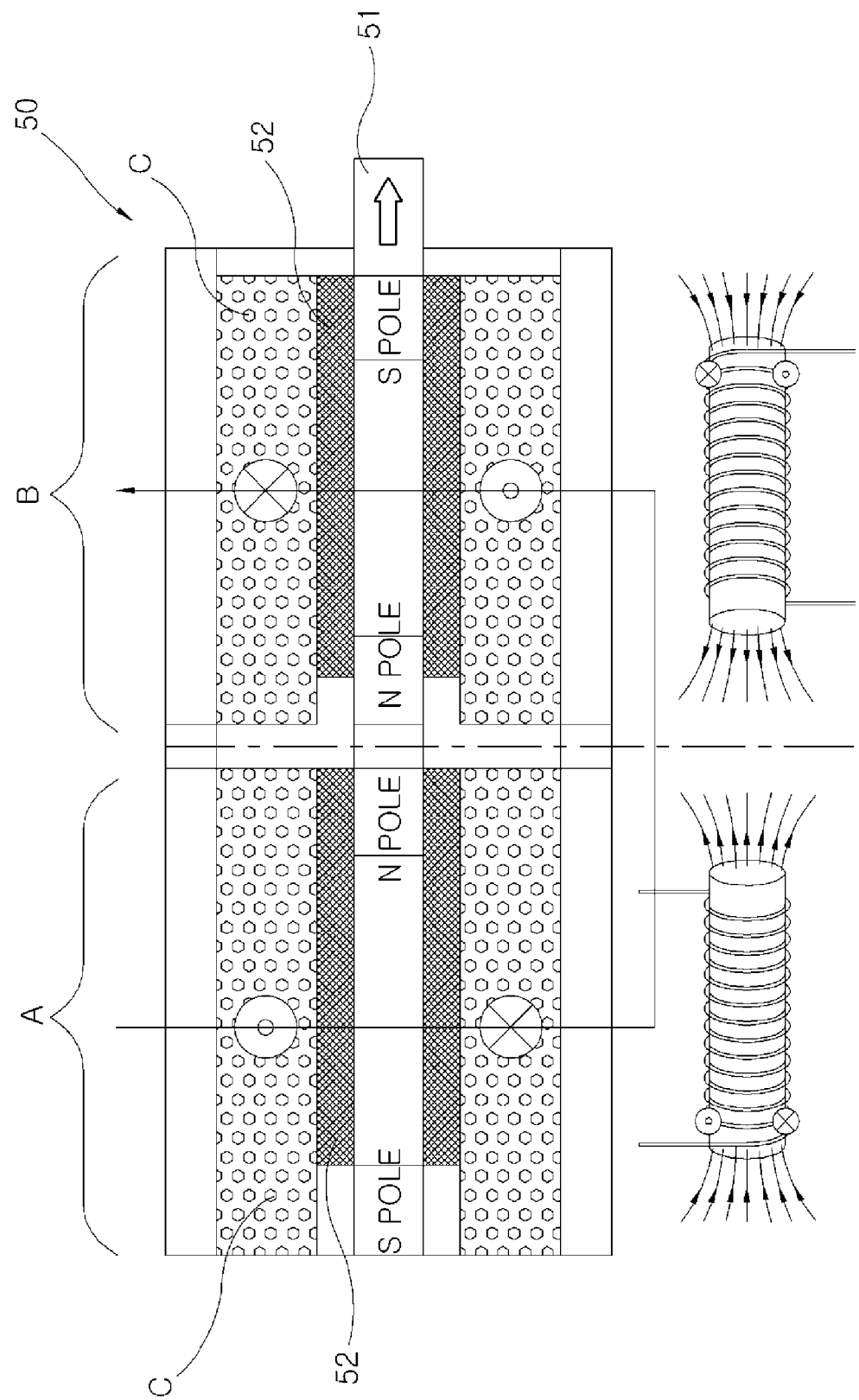
FIG. 4 is a cross-sectional view of the driving unit of the exemplary vibration generator which is applied to the driver state detection system with an accelerator pedal control function according to the present invention.

FIG. 4 is a cross-sectional view of the driving unit of the vibration generator which is applied to the driver state detection system with an accelerator pedal control function according to various embodiments of the present invention. As illustrated in FIG. 4, when a current is applied to an electric wire according to the Fleming's right-hand law which is typically applied, S and N poles are formed at points of entry and exit of current, respectively, by a magnetic field formed around a coil C. This principle is applied to driving unit 53.

An electric motor manufactured according to the above-described principle is referred to as a voice coil motor. In the structure of a speaker, a diaphragm vibrates according to changes in the direction and amount of current applied to a voice coil. The reason why the electric motor is referred to as the voice coil motor is that the voice coil motor has a similar principle to the speaker's principle.

The voice coil motor has the same principle as a solenoid principle. Since a magnet is attached to a basic solenoid, the voice coil motor has both functions of push/pull.

That is, as illustrated in FIG. 4, magnetic members 52 are installed on portions A and B, respectively, so as to surround the outer circumference of hitting member 51. A current is applied to the portion A to form the S pole in the upper left side of FIG. 4, and the S pole of hitting member 51 is moved to the right side by a repulsive force. A current in the opposite direction is applied to the portion B to form the N pole in the left side, and the N pole of hitting member 51 is also moved to the right side by a repulsive force. Accordingly, hitting member 51 is moved toward the right side.

Figure 5:
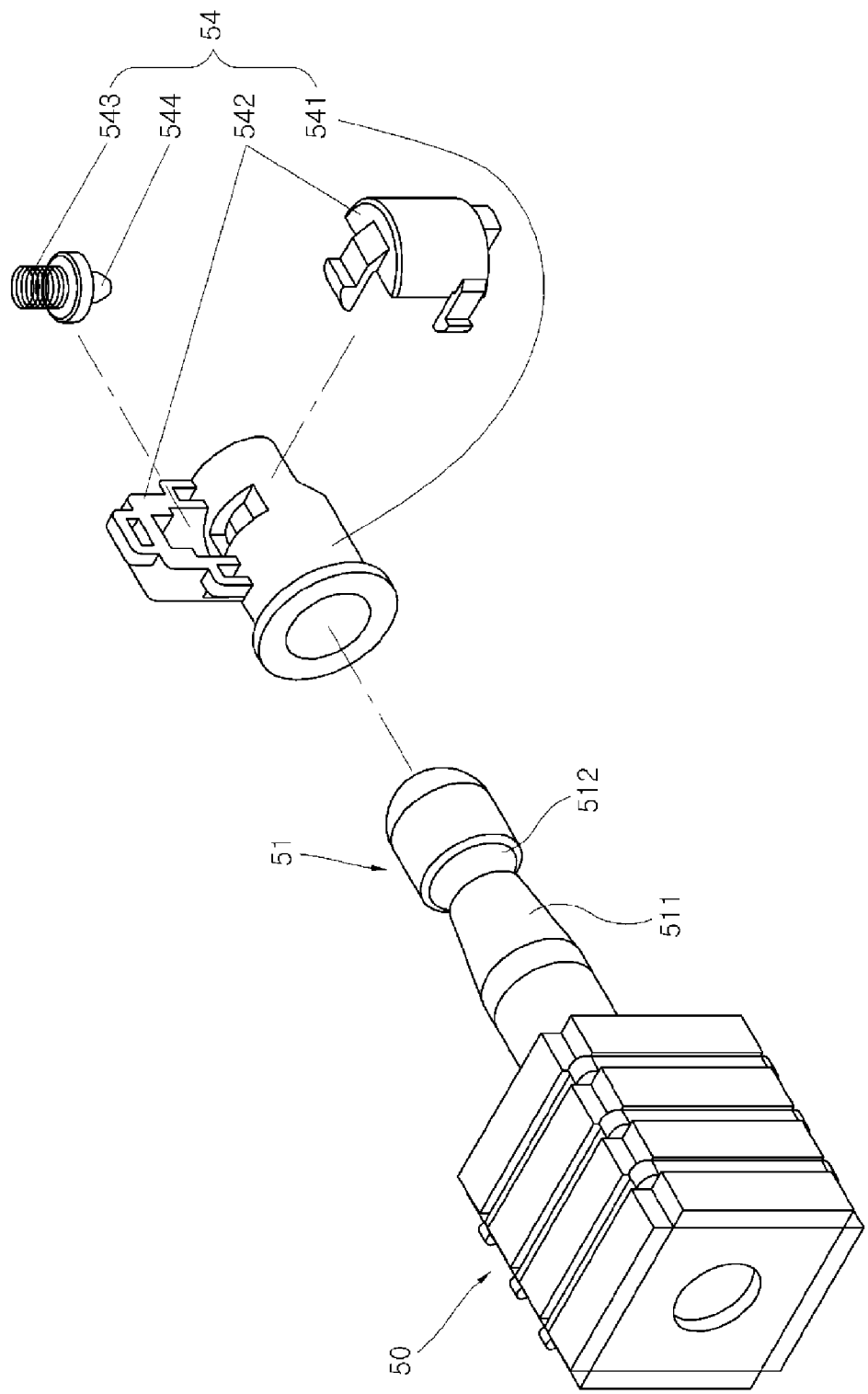
FIG. 5 is an exploded perspective view of the exemplary vibration generator which is applied to the driver state detection system with an accelerator pedal control function according to the present invention.

FIG. 5 is an exploded perspective view of the vibration generator which is applied to the driver state detection system with an accelerator pedal control function according to various embodiments of the present invention. As illustrated in FIG. 5, vibration generator 50 is coupled to guide unit 54, and guide unit 54 includes a guide housing 541, a housing cover 542, an elastic member 543, and a guide protrusion 544.

Guide housing 541 has a space into which an end of hitting member 51 is inserted. Housing cover 542 is disposed in such a manner as to surround the outside of guide housing 541, and housing cover 542 has guide protrusion 544 installed therein and elastically supported by elastic member 543.

That is, as illustrated in FIG. 5, guide protrusion 544 is disposed so as to be pressurized downward by elastic member 543, and an end of guide protrusion 544 is contacted with the outer circumference of hitting member 51. At this time, an inclined surface 511 is formed on the outer circumference of hitting member 51 such that the diameter of hitting member 51 gradually decreases toward the end thereof. A locking groove 512 is formed on inclined surface 511 such that guide protrusion 544 is locked and fixed to locking groove 512.

Therefore, when hitting member 51 is vertically reciprocated by driving unit 53, the end of guide protrusion 544 is slid along inclined surface 511 of hitting member 51. At this time, a movement distance of hitting member 51 toward guide unit 54 may be limited by the locking operation between guide protrusion 544 and locking groove 512.

Meanwhile, hitting member 51 is moved toward driving unit 53 by an elastic force of guide protrusion 544 through inclined surface 511. Therefore, when a one-way coil is applied in such a manner that hitting member 51 is not moved in both directions but is moved only in one direction, the structure may be further simplified.

Inclined surface 511 may serve to prevent hitting member 51 from being unexpectedly moved front and back by the inertia while the vehicle is driven.

Figure 6A:
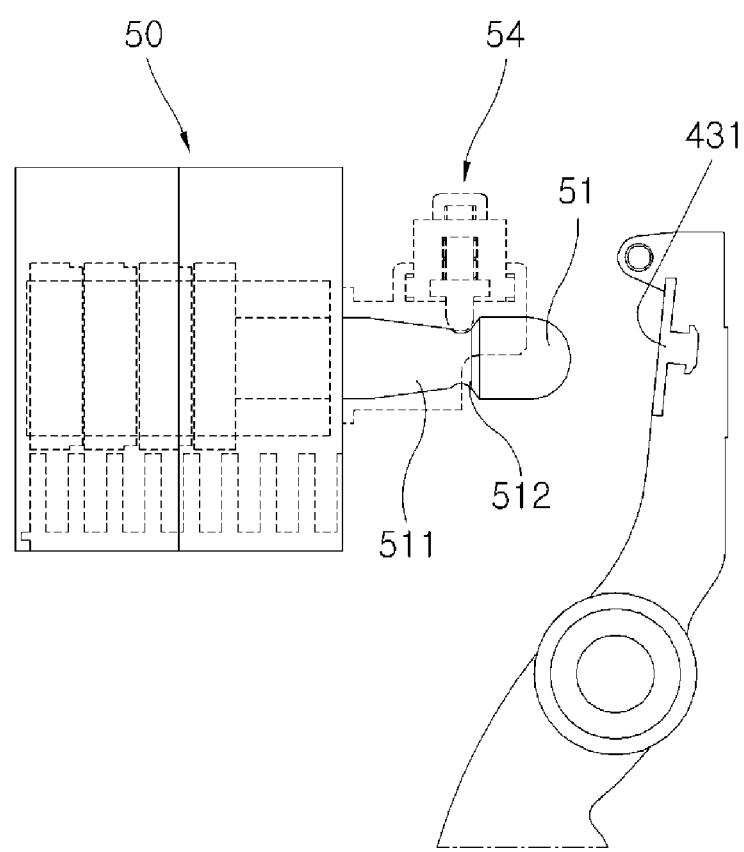
FIGS. 6A and 6B illustrate an operation state between the exemplary vibration generator and pedal arm which are applied to the driver state detection system with an accelerator pedal control function according to the present invention.
Figure 6B:
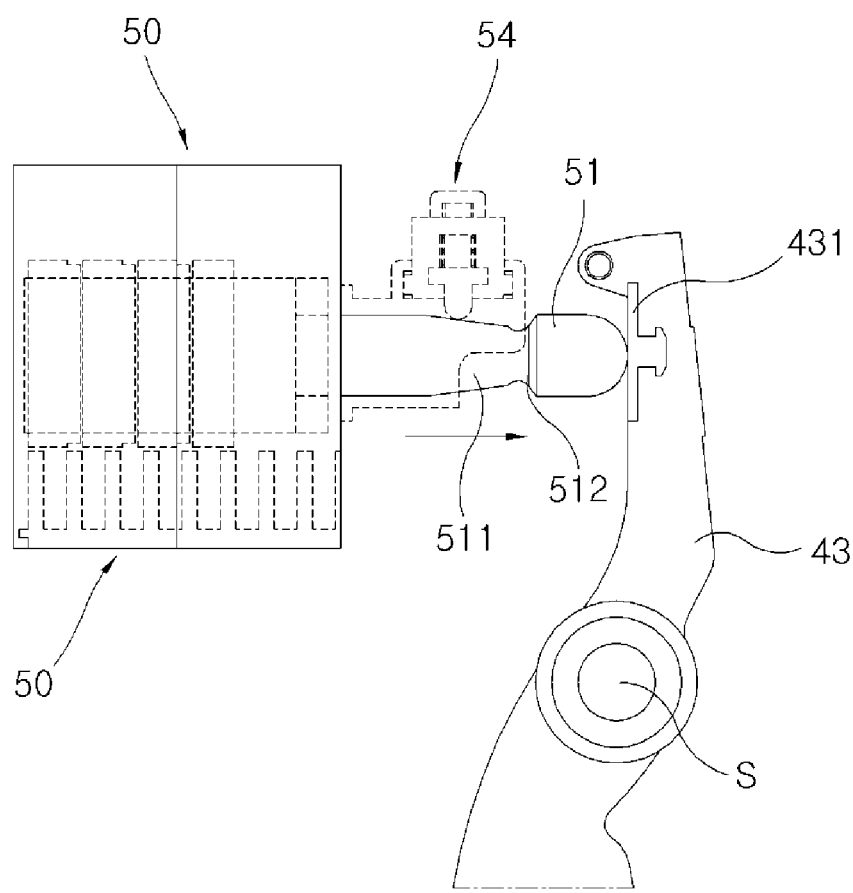

That is, FIGS. 6A and 6B illustrate a state between the vibration generator and the pedal arm which are applied to the driver state detection system with an accelerator pedal control function according to various embodiments of the present invention. As illustrated in FIG. 6A, vibration generator 50 and pedal arm 43 are disposed so as to be spaced a predetermined distance from each other. At this time, a hitting absorption member 431 is installed on one surface of pedal arm 43 facing vibration generator 50. As illustrated in FIG. 6B, hitting absorption member 431 serves to reduce noise when hitting member 51 comes in contact with pedal arm 43 while the step force of pedal arm 43 is applied or the vibration mode of vibration generator 50 is operated. That is, when the end of hitting member 51 is formed in a hemispherical shape, hitting absorption member 431 comes in point contact with hitting member 51, even though pedal arm 43 is placed at any position. Accordingly, the step force or vibration mode is smoothly performed.

FIG. 7 is a flow chart showing a driver state detection method with an accelerator pedal control function according to various embodiments of the present invention. As shown in FIG. 7, pedal controller 20 determines whether a driver is carelessly driving a vehicle or not, based on a signal transmitted from driver state detector 10 (S110). For example, when the face direction of the driver is maintained at 20 degrees or more with respect to the front for 1.5 second or more, pedal controller 20 may determine that the driver is carelessly driving the vehicle. When the eyes of the driver are closed for 1.5 second or more in a state where the face direction of the driver is maintained between −20 degrees and 20 degrees, pedal controller 20 may determine that the driver fell asleep at the wheel, that is, determine that the driver is carelessly driving the vehicle.

When the condition of step S110 is not satisfied, the process proceeds to step S111 where an operation signal of vibration generator 50 is not transmitted, and the initial position is maintained (S112).

When the condition of step S110 is satisfied, whether vibration generator 50 is operated or not is determined again. At this time, vibration generator 50 is controlled on the basis of a signal detected from electronic, control unit 30 (S121).

That is, ambient signals of the vehicle are received on the basis of the signal detected from electronic control unit 30, and whether the vehicle is driven or stopped is determined (S120).

When the condition of step S120 is satisfied, pedal controller 20 determines that the driver is carelessly driving the vehicle, and transmits an operation signal to vibration generator 50 to call the driver's attention (S130). In this case, when any one of the conditions of steps S110 and S120 is not satisfied, pedal controller 20 does not determine that the driver is carelessly driving the vehicle. Accordingly, the operation signal of vibration generator 50 may not be transmitted.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A driver-state detection system with an accelerator pedal control function, comprising:
    a driver-state detector detecting a driving state of a driver and determining whether the driver is carelessly driving a vehicle or not;
    a pedal controller receiving an operation signal from the driver-state detector;
    a vehicle state detector determining whether the vehicle is driven or stopped, based on ambient signals of the vehicle;
    an operation pedal receiving operation signals from the pedal controller and the vehicle state detector; and
    a vibration generator installed on the operation pedal and provided to generate or cancel a vibration of a motor;

wherein the vibration generator comprises:
a hitting member that reciprocates in two directions;
a driving unit driving the hitting member in a state where one end of the hitting member is inserted into the driving unit; and
a guide unit guiding a reciprocating motion of the hitting member in a state where the other end of the hitting member is inserted into the guide unit.

2. The driver-state detection system as defined in claim 1, further comprising:
a pedal arm spaced a predetermined distance from the hitting member; and
a hitting absorption member formed on one surface of the pedal arm facing the hitting member and repeatedly hit by the one end of the hitting member as the hitting member reciprocates.

3. The driver-state detection system as defined in claim 1, wherein the driving unit has a forward coil and a backward coil formed therein to drive the hitting member in both directions.

4. The driver-state detection system as defined in claim 2, wherein the hitting member includes an outer circumference and an inclined surface formed on the outer circumference such that the diameter of the hitting member gradually decreases toward the hitting absorption member;
a locking groove formed on the inclined surface; and
a guide protrusion formed so as to be elastically supported by an elastic member in a direction perpendicular to the inclined surface.

5. The driver-state detection system as defined in claim 4, wherein the driving unit has a forward coil formed therein to move the hitting member toward the hitting absorption member.

6. The driver-state detection system as defined in claim 1, wherein the operation pedal is one of a pendent-type accelerator pedal, an eco-organ accelerator pedal, and a box-type accelerator pedal.

* * * * *